United States Patent [19]

Su

[11] Patent Number: 4,991,202
[45] Date of Patent: Feb. 5, 1991

[54] COIN CALL TELEPHONE APPARATUS

[76] Inventor: Lih-Chuan Su, No. 1, Alley 33, Lane 788, Hsin Chuan Chih Rd., Tso Ying District, Kaohsiung, Taiwan

[21] Appl. No.: 430,450

[22] Filed: Nov. 2, 1989

[51] Int. Cl.⁵ .................. H04M 1/02; H04M 17/02
[52] U.S. Cl. .................................. 379/146; 379/150; 194/344
[58] Field of Search .................. 379/146, 150, 155; 194/344

[56] References Cited

U.S. PATENT DOCUMENTS 4,841,563 6/1989 Sano et al. ...................... 379/150

Primary Examiner—Stafford D. Schreyer
Attorney, Agent, or Firm—Varndell Legal Group

[57] ABSTRACT

A coin call telephone apparatus includes a control device comprised of a housing having set therein a coin track for continuous insertion therethrough of a coins of different value without interrupting the line so as to let the line be continuously keeping on for conversation. When a call is terminated or if the line is engaged, coins drop into refund slot immediately after hand set is hung on the cradle of the housing, and the pressure force from the cradle immediately forces a link rod to move downward to further drive a curved retainer frame to turn back so as to turn off the telephone apparatus.

1 Claim, 6 Drawing Sheets

COIN CALL TELEPHONE APPARATUS

BACKGROUND OF THE INVENTION

Since the invention of telephone apparatus, the communication between people becomes more and more convenient and frequent. Following technology improvement, telephone apparatus has also been improved in function to make communication easy. Regular telephone apparatus may include regular line controlled type for regular home or office use, and a coin call type for public use. Regular coin call telephone apparatus are normally controlled by means of IC. Ic board is practical in function control but expensive and difficult to maintain. Further, regular coin call telephone apparatus are normally having three separate coin slots for respectively insertion therein of coins of different value. When in operation, one must make sure that coins of different value are correspondingly inserted into right coin slots. When a first coin is consumed, one must have to press down the control button to continue the calling after another coin is inserted, that is, control button must be pressed down each time after each insertion of coins.

The main object of the present invention is to provide such a coin call telephone apparatus which includes a magnet to efficiently control slotting process by means of a push-button.

Another object of the present invention is to provide such a coin call telephone apparatus which provides high sensitivity to efficiently perform coin slotting and refunding process and which is durable in use.

Another object of the present invention is to provide such a coin call telephone apparatus which is easy and inexpensive to manufacture.

Another object of the present invention is to provide such a coin call telephone apparatus which includes one single slot track to simultaneously accept coins of different value.

A yet further object of the present invention is to provide such a coin call telephone apparatus which accepts continuous insertion of same of different value to keep the line on without repeatedly pressing down the control button.

The above and other objects, features and advantages of the present invention will become fully understood from the following detailed description of the preferred embodiments considered in connection with the annexed drawings in which:

DETAILED DESCRIPTION OF THE PREFERRED EMBODIMENTS

Figure 1:
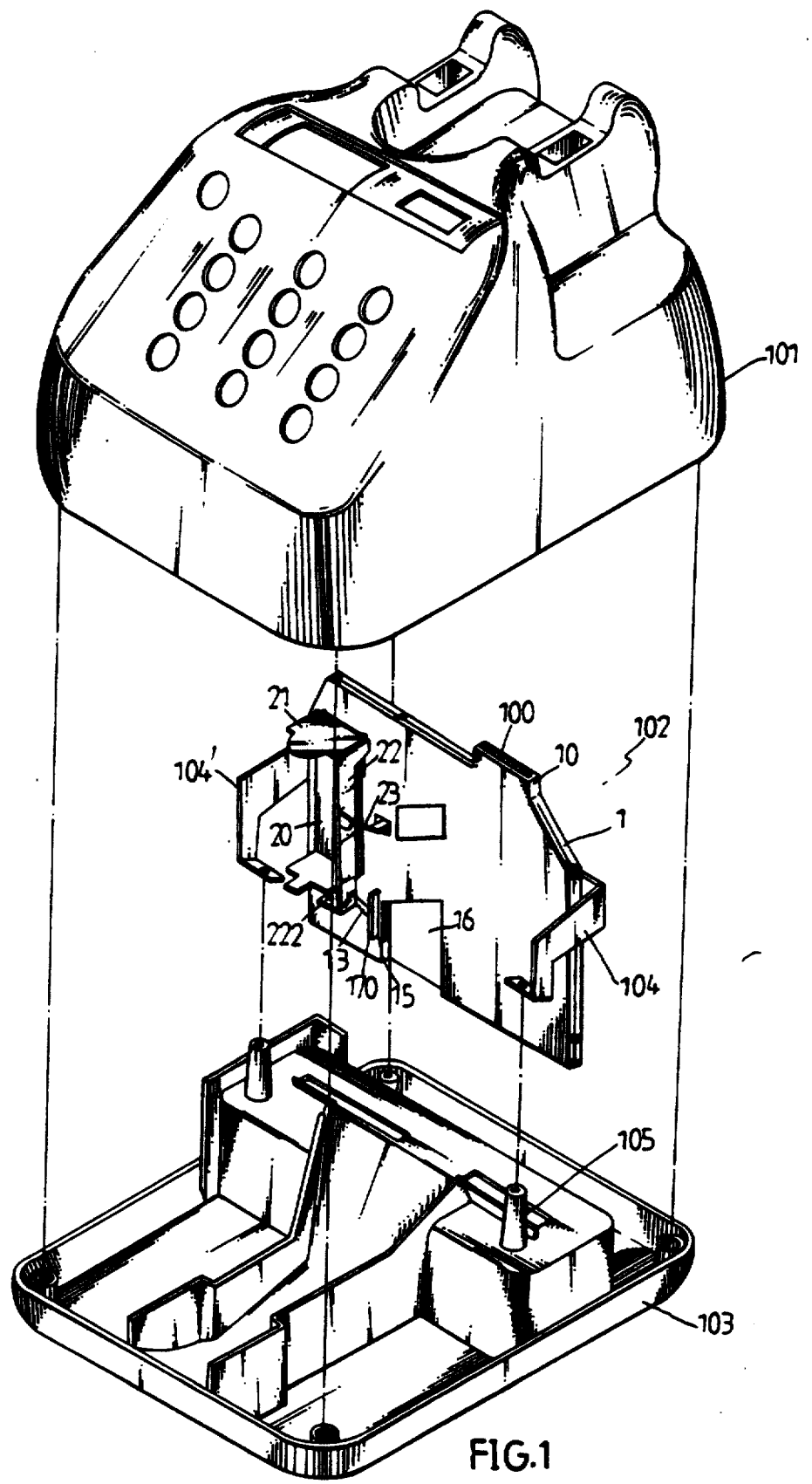
FIG. 1 is a perspective fragmentary view of a coin call telephone apparatus embodying the present invention.

Turning now to the attached drawings in detail and firstly referring to FIG. 1, therein illustrated is a coin call telephone apparatus constructed according to the present invention and generally comprised of a casing 101, a control device 102 and a bottom block 103. The control device 102 includes two side arms 104 and 104' having two holes made thereon for insertion therein respectively of two screw bolts to fixedly mount the control device 102 on the two bolt holes 105 of the bottom block 103 inclining forward at an angle of 15° from the vertical axis through the bottom block 103. After the control device 102 is fixedly attached to the bottom block 103, the casing 101 is then mounted on the bottom block 103 to receive the control device 102 therein.

Figure 2:
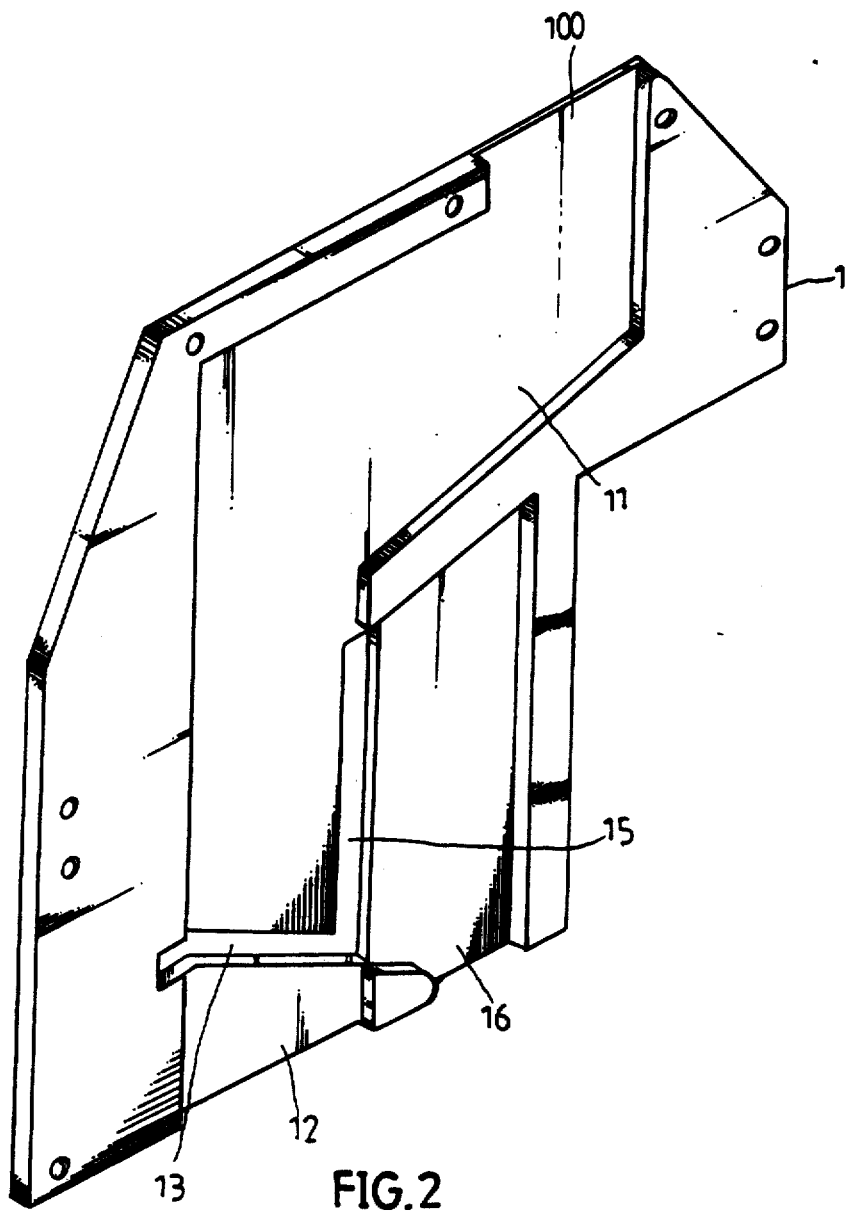
FIG. 2 is a perspective view of a coin slot track constructed according to the present invention.

Referring to FIG. 2, the control device 102 comprises a housing 1 having a coin slot 100 at the top for insertion therethrough of coins of different value, a coin entrance 12 at the bottom, a track 11 obliquely disposed in the middle for communication of the coin slot 100 to the coin entrance 12. When a coin is inserted through the coin slot 100, it runs along the track 11 to drop to an elongated transverse slot 13 disposed at the bottom of the housing 1. An elongated exit 15 for return of coin is set at one lateral side of the track 11. In order to prevent a coin from entering through the elongated exit 15 into refund slot 16, a stop plate 170 is inserted through the elongated exit 15 to stop coin from running into the refund slot 16.

Figure 3:
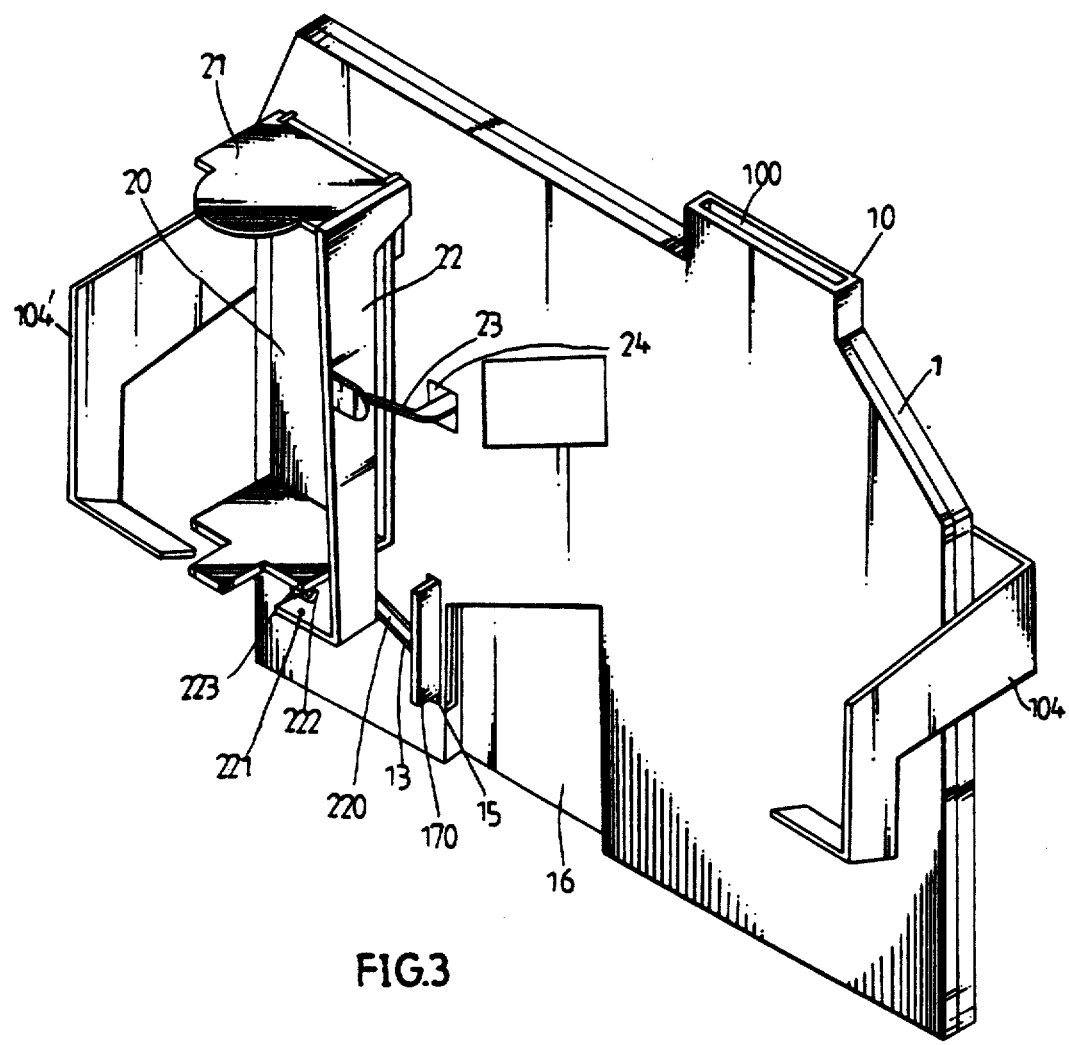
FIG. 3 is a perspective back view of the embodiment of FIG. 1.
Figure 4:
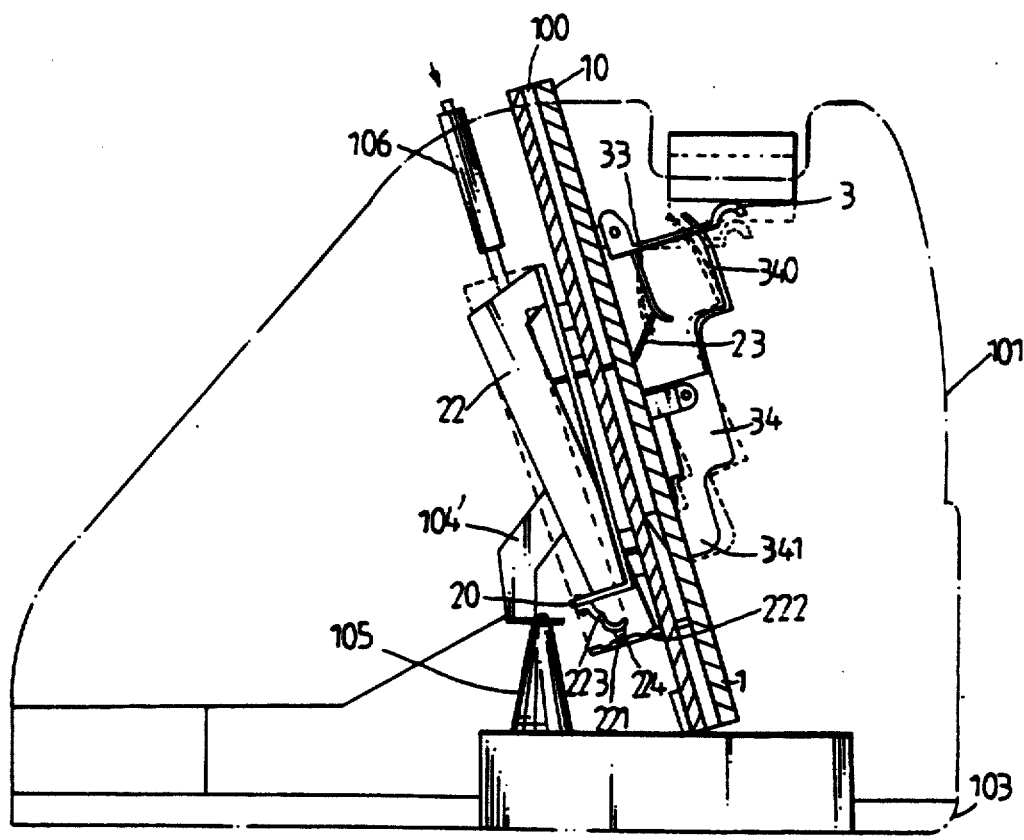
FIG. 4 is a schematic drawing, illustrating the operation of the present invention when a coin is inserted therein.
Figure 5:
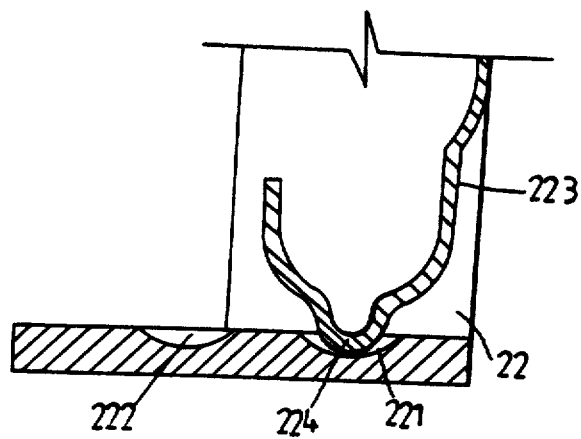
FIG. 5 is a sectional view, illustrating the structure and the operation of the link rod.
Figure 6:
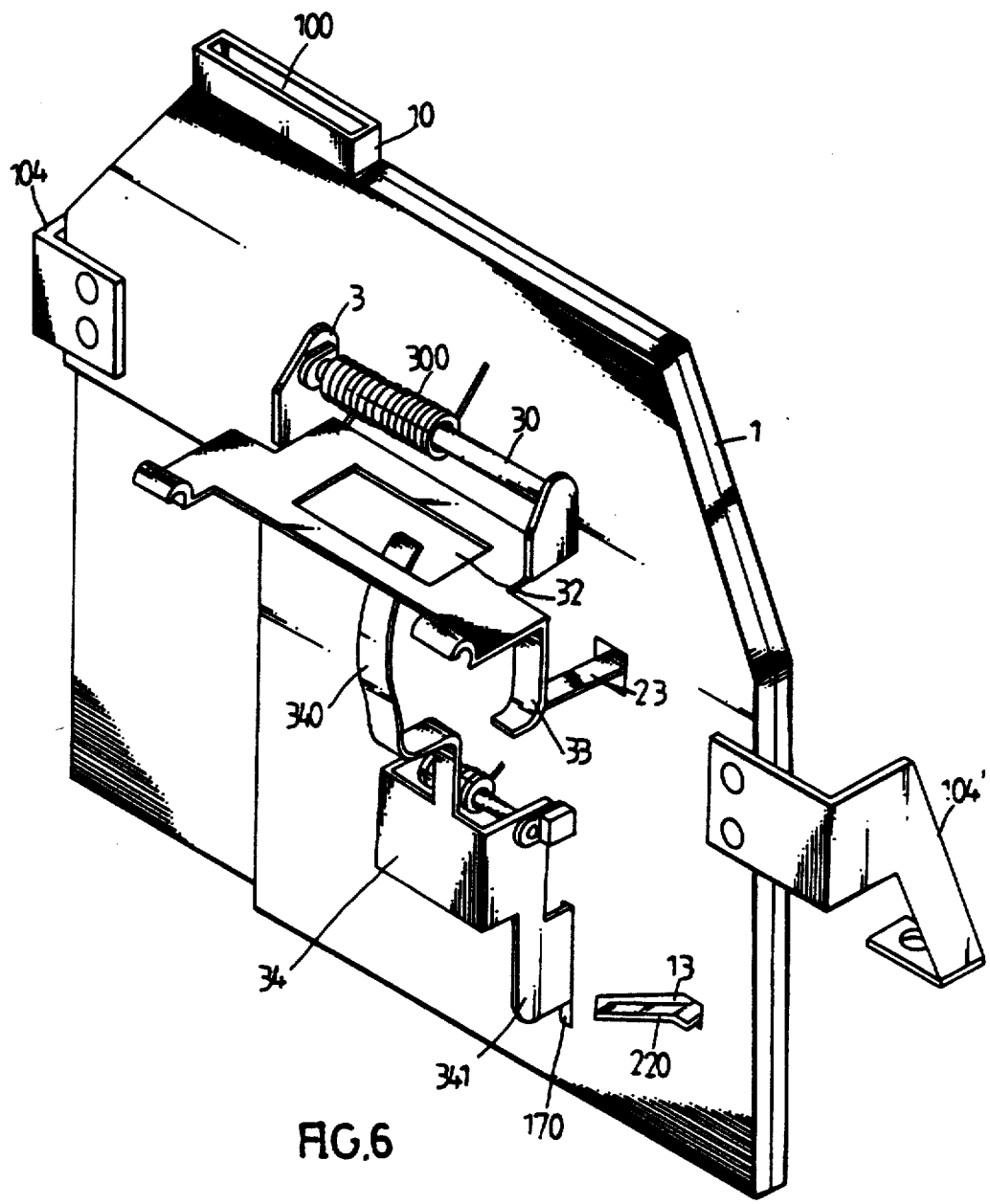
FIG. 6 is a perspective front view of a coin slot structure embodying the present invention.

Referring to FIGS. 3, 4 and 5, when a coin is inserted through the coin slot 100, it is controlled by a slotting mechanism through a push button 106 to pass through the coin entrance 12, which slotting mechanism is generally comprised of a holder plate 20, a movable U-shaped plate 21 mounted on the holder plate 20, a link rod 22 coupled with the U-shaped plate 21 at one lateral side and having two circular recesses 221 and 222 made thereon, a push plate 220 connected to the link rod 22 at the bottom and penetrating through the elongated transverse slot 13, a curved retainer frame 223 connected to the holder plate 20 at the bottom comprising a projecting end 224 alternatively seated in either one of the two recesses 221 and 222 of the link rod 22, and a rectangular rod 23 connected to the middle part of the link rod 22 and penetrating through a hole 24 made on the housing 1 to connect a refunding mechanism for linking-up operation. When coin is inserted (the amount of coins to insert may be determined according to requirement), telephone apparatus gives a "buzz" to advise the user to press on the control button 106. When the control button 106 is pressed on, the U-shaped plate 21 is simultaneously pressed to drive the link rod 22 to move downward to further drive the curved retainer frame 223 of the holder plate 20 to move away from the recess 222 and to seat in the other recess 221 so as to let the link rod 22 be kept in a downward position. Therefore, the U-shaped plate 21 is allowed to turn downward to drive push plate 220 to protrude beyond the elongated transverse slot 13 to let inserted coin drop through the back side of the push plate 220 (also see FIG. 1). Because of the effect of the curved retainer frame 223, the push plate 220 is firmly retained to allow continuously insertion of coins.

Figure 7:
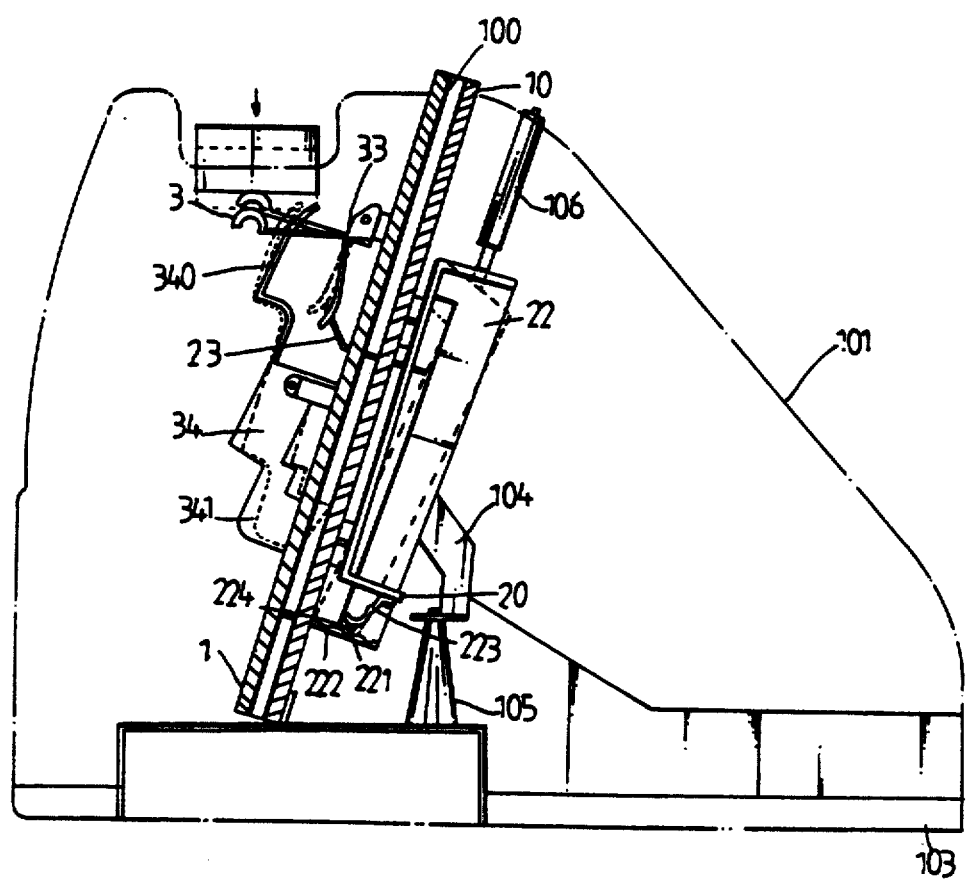
FIG. 7 is a schematic drawing illustrating the operation of the present invention when a coin is returned.

Referring to FIGS. 5 and 7, after a call is finished or when the line is engaged, a refunding mechanism must be operated to return inserted coins. As illustrated, the refunding mechanism according to the present invention is including a cradle 3 turnably mounted on a round rod 30 having a rectangular hole 32 made thereon, a return spring 300 mounted on the round rod 30, a refund plate 34 having at the top a curved strip portion 340 attached to one inner side of the rectangular hole 32 and having at the bottom a stop plate portion 341 inserted through a hole 170 made on the track of the housing 1 to prevent from dropping of coin through the refund hole 16, an elongated follower plate 33 constantly pressed on the rectangular rod 23 of the slotting mechanism to stop coin slotting operation. When the hand set of the telephone apparatus is hung on the cradle 3, after a call is finished or the line is engaged, to force the cradle 3 to turn downward, the refund plate 34 is forced, by means of the curved strip portion 340, to turn rightward. In consequence, the stop plate portion 341 of the refund plate 34 is forced to move rightward to let the coins in the track 11 drop through the elongated exit 15 into the refund slot 16 for return.

As described above, the present invention is to provide such a coin slot structure for coin call telephone apparatus, which includes a coin insertion mechanism matching with a coin slotting mechanism and a coin refunding mechanism to allow for continuous insertion of coins for extended calling, and which makes use of a magnet for the coin slotting mechanism to make the operation more practical and to make the structure more economic.

What is claimed is:

1. A coin call telephone apparatus, including a bottom block having mounted thereon a control device and covered with a casing, wherein said control device includes:

a coin insertion mechanism, comprising a housing having a slot made thereon at the top for insertion therein of coins, a coin entrance at the bottom, and a track obliquely disposed in the middle to connect said coin slot to said coin entrance;

a coin slotting mechanism being set at the left lower side of said housing and generally comprised of a holder plate, a movable U-shaped plate mounted on said holder plate, a link rod coupled with said U-shaped plate at one lateral side having two circular recesses made thereon, a press button mounted on said casing to alternatively press on or leave from said U-shaped plate, a push plate connected to said link rod at the bottom and penetrating through an elongated transverse slot, a curved retainer frame connected to said holder plate at the bottom comprising a projecting end alternatively seated in either one of said two circular recesses of said link rod, and a rectangular rod connected to the middle part of said link rod and penetrating through a hole made on said housing to connect to a refunding mechanism; and a coin refunding mechanism comprising a cradle turnably mounted on a round rod having a rectangular hole made thereon, a return spring mounted on said round rod, a refund plate having at the top a curved strip portion attached to one inner side of said rectangular hole and having at the bottom a stop plate portion inserted through a hole made on said track of said housing to prevent from dropping of coin through a refund hole, an elongated follower plate constantly pressed on said rectangular rod of said slotting mechanism to stop coin slotting operation;

characterized in that when said press button is pressed down, said U-shaped plate is simultaneously pressed to drive said link rod to move downward to further drive said curved retainer frame of said holder plate to move away from one recess to seat in the other recess so as to let said link rod be kept in a downward position and the let said U-shaped plate turn downward to drive said push plate to protrude beyond said elongated transverse slot to further let inserted coin drop through the back side of said push plate to allow continuously insertion of coins without pressing down the control button again; when the hand set of the associated telephone apparatus is hung on said cradle after a call is finished or if the line is engaged, said refund plate is forced, by means of said curved strip portion, to turn rightward to force said stop plate portion of said refund plate to move rightward, to let said elongated follower plate press on said rectangular rod to further drive said push plate to return to original position so as to stop coin slotting operation and to let any coins remained in said track drop through said elongated exit into said refund slot for return.

* * * * *